(12) United States Patent
Takahashi

(10) Patent No.: US 10,205,840 B2
(45) Date of Patent: Feb. 12, 2019

(54) PRINTING DEVICE PROVIDED WITH PROTRUDING PART FOR FIXING DISPLAY MEMBER TO CASING

(71) Applicant: Brother Kogyo Kabushiki Kaisha, Nagoya-shi, Aichi-ken (JP)

(72) Inventor: Ryoya Takahashi, Gifu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 12 days.

(21) Appl. No.: 15/415,955

(22) Filed: Jan. 26, 2017

(65) Prior Publication Data

US 2017/0213061 A1    Jul. 27, 2017

(30) Foreign Application Priority Data

Jan. 27, 2016   (JP) .................. 2016-013222

(51) Int. Cl.
| | | |
|---|---|---|
| *G06K 7/10* | (2006.01) | |
| *H04N 1/00* | (2006.01) | |
| *G06K 15/02* | (2006.01) | |

(52) U.S. Cl.
CPC ......... *H04N 1/0083* (2013.01); *G06K 15/022* (2013.01); *H04N 1/00129* (2013.01); *H04N 1/00496* (2013.01); *H04N 2201/0096* (2013.01)

(58) Field of Classification Search
CPC .... G06K 15/02; G06K 15/021–15/024; G06K 7/10881
See application file for complete search history.

(56) References Cited

U.S. PATENT DOCUMENTS

| | | | | |
|---|---|---|---|---|
| 6,594,472 | B1 * | 7/2003 | Curtis | H04M 1/0252 |
| | | | | 379/428.01 |
| 8,814,049 | B2 * | 8/2014 | Lee | G06K 7/10881 |
| | | | | 235/462.3 |
| 9,301,583 | B2 * | 4/2016 | Kano | A45C 11/00 |
| 2004/0089570 | A1 * | 5/2004 | Chien | H04M 1/18 |
| | | | | 206/320 |

FOREIGN PATENT DOCUMENTS

| | | |
|---|---|---|
| JP | H05-334864 A | 12/1993 |
| JP | H06-026339 U | 4/1994 |
| JP | 2016-104542 A | 6/2016 |

* cited by examiner

*Primary Examiner* — Thien M Le
*Assistant Examiner* — April Taylor
(74) *Attorney, Agent, or Firm* — Banner & Witcoff, Ltd.

(57) ABSTRACT

A printing device includes: a casing, a display member, a printed circuit board, and a key sheet. The display member is configured to display information thereon. The display member has an edge face. The key sheet is fixed to the casing and faces the printed circuit board. The key sheet includes: a base sheet, a plurality of key tops, and a protruding part. The base sheet provides elasticity and is positioned beside the display member. The base sheet has a peripheral edge facing the edge face of the display member. The plurality of key tops is provided at the base sheet. The protruding part is provided at the base sheet. The protruding part includes a first protruding part protruding from the peripheral edge of the base sheet toward the display member and contacting the edge face of the display member to urge the display member.

14 Claims, 13 Drawing Sheets

1

PRINTING DEVICE PROVIDED WITH PROTRUDING PART FOR FIXING DISPLAY MEMBER TO CASING

CROSS REFERENCE TO RELATED APPLICATION

This application claims priority from Japanese Patent Application No. 2016-013222 filed Jan. 27, 2016. The entire content of the priority application is incorporated herein by reference.

TECHNICAL FIELD

The present disclosure relates to a printing device provided with a display member for displaying information.

BACKGROUND

A printing device provided with a display member, such as a liquid crystal display, is well known in the art. Some technologies have been proposed for securely attaching a display member to the body of a printing device so that there is no play in the display member. Japanese Patent Application Publication No. H05-334864 discloses a technology for attaching a liquid crystal display board to a supporting plate. In this technology, an elastic member is fixed to the supporting plate with screws. The elastic member applies force through two side surfaces forming one corner of the liquid crystal display board. This force presses other two side surfaces forming an opposing corner of the liquid crystal display board against a positioning member that protrudes from the supporting plate, thereby fixing the liquid crystal display board to the supporting plate.

SUMMARY

However, the technique described in Japanese Patent Application Publication No. H05-334864 requires sufficient free space around the liquid crystal display board for fixing the elastic member to the supporting plate. Accordingly, this technique is not applicable in a printing device that does not have sufficient space around the display member since it would not be possible to fix an elastic member to the supporting plate on the periphery of the display member. Consequently, it is difficult to attach a display member to the body of the printing device without play in the display member when there is not adequate space around the periphery of the display member.

It is therefore an object of the disclosure to provide a printing device having a body on which a display member can be securely mounted without play, even when there is little space around the periphery of the display member.

In order to attain the above and other objects, the disclosure provides a printing device including: a casing, a display member, a printed circuit board, and a key sheet. The display member is configured to display information thereon. The display member has an edge face. The key sheet is fixed to the casing and faces the printed circuit board. The key sheet includes: a base sheet, a plurality of key tops, and a protruding part. The base sheet provides elasticity and is positioned beside the display member. The base sheet has a peripheral edge facing the edge face of the display member. The plurality of key tops is provided at the base sheet. The protruding part is provided at the base sheet. The protruding part includes a first protruding part protruding from the peripheral edge of the base sheet toward the display member and contacting the edge face of the display member to urge the display member.

BRIEF DESCRIPTION OF THE DRAWINGS

The particular features and advantages of the disclosure will become apparent from the following description taken in connection with the accompanying drawings, in which.

DETAILED DESCRIPTION

Figure 1:
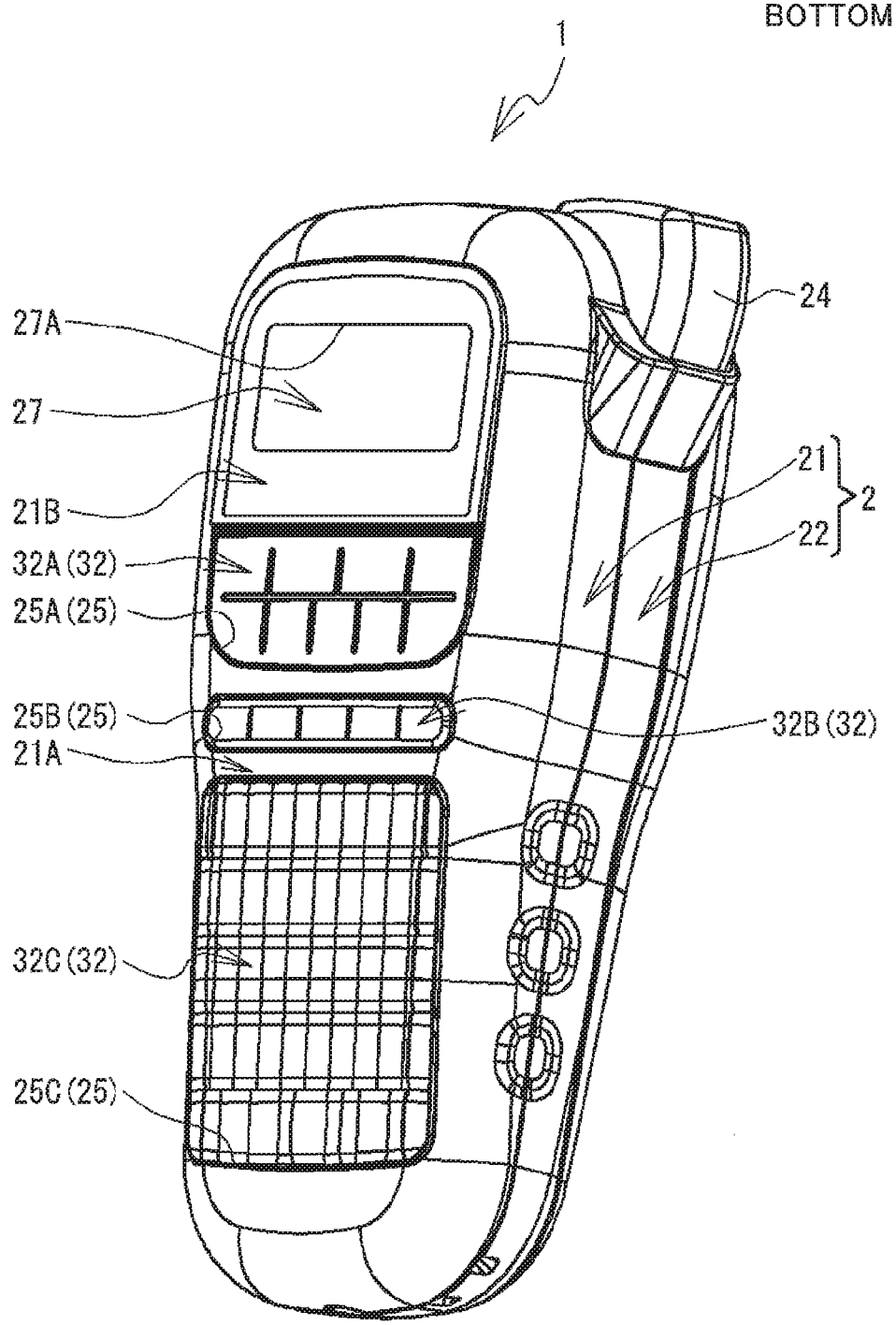
FIG. 1 is a perspective view of a tape printer according to one embodiment.

Next, an embodiment of the present disclosure will be described while referring to the accompanying drawings. The referenced drawings are used for illustrating technical features that the present disclosure may employ and are merely illustrative examples. It is not intended that the present disclosure be limited to only the structures of devices illustrated in the drawings. In the following description, the top, bottom, left, and right sides of a tape printer 1 are respectively defined as the top, bottom, left, and right sides shown in FIG. 1. The front and rear sides of the tape printer 1 are respectively defined as the far side and near side in FIG. 2.

[Overall Structure of Tape Printer 1]

The tape printer 1 is a printing device equipped with a detachably mountable tape cassette (not shown) and is capable of printing characters, such as letters, numbers, and graphic symbols, on tape accommodated in the tape cassette. The tape may be a thermal-type printing medium, for example. One surface of the tape is a printing surface that produces color when exposed to heat, while a release paper is affixed to another surface through a coating of adhesive.

Figure 2:
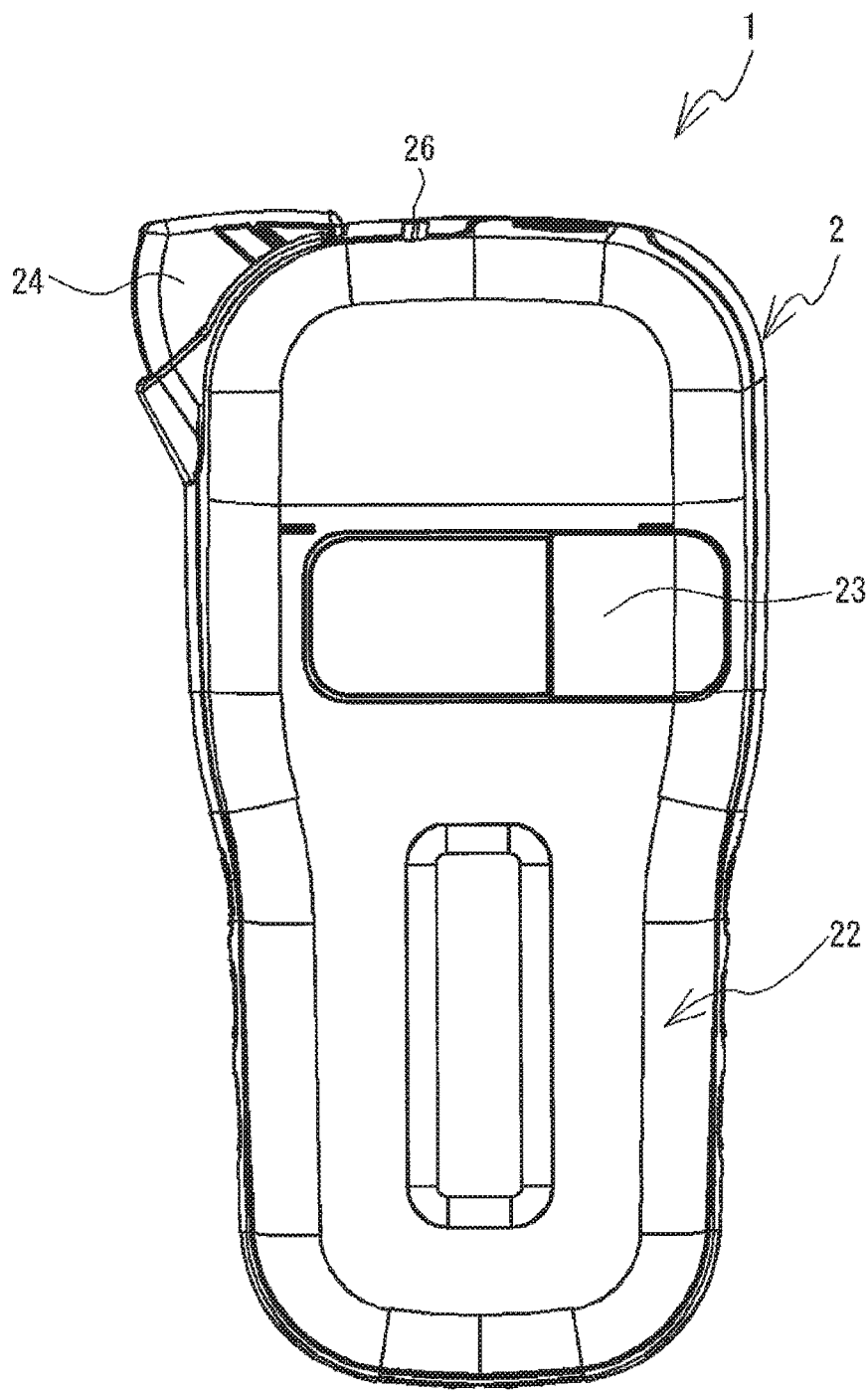
FIG. 2 is a rear view of the tape printer.

As illustrated in FIGS. 1 and 2, the tape printer 1 includes a casing 2. The casing 2 has a general rectangular shape in a plan view and extending in a top-bottom direction. The casing 2 has a box-like shape with substantial thickness in a front-rear direction and rounded corners. The casing 2 is formed of a resin material. The casing 2 includes a front casing 21, a rear casing 22, and a back cover 23. The front casing 21 constitutes a front wall of the casing 2 and front-side portions of the top, bottom, left, and right walls. The rear casing 22 constitutes a rear wall of the casing 2 and rear-side portions of the top, bottom, left, and right walls. The back cover 23 is removably attached to a rear wall of the rear casing 22. A key sheet 3, a printed circuit board 4, a liquid crystal display (hereinafter called a "LCD") 5 (see FIG. 3), and the like are mounted in the front casing 21. A transparent window is provided in the back cover 23 so that a tape cassette mounted in the tape printer 1 is visible outside the casing 2. A printing mechanism, cutting mechanism, and the like (not shown) are mounted in the rear casing 22. The box-shaped casing 2 is configured by assembling the front casing 21 and the rear casing 22 with the back cover 23 mounted thereon in the front-rear direction.

As illustrated in FIG. 1, the front casing 21 has an input section 21A, and a display section 21B. The input section 21A constitutes a front wall portion of the front casing 21 extending from a position above the vertical center to the bottom end of the front casing 21. Openings 25A, 25B, and 25C (hereinafter collectively referred to as the "openings 25") are formed in the input section 21A and penetrate the input section 21A in the front-rear direction. The key sheet 3 mounted in the front casing 21 includes pluralities of key tops 32 (see FIG. 6). The key tops 32 are inserted into the openings 25 from an inner side of the front casing 21 and are exposed on the outside of the front casing 21. The tape printer 1 receives various inputted instructions through the input section 21A.

The display section 21B constitutes a part of the front wall of the front casing 21 above the input section 21A. A window 27 is provided in the display section 21B. The window 27 has a plate shape and is formed of a transparent or translucent resin. A rectangular opening 27A is formed in the display section 21B on the rear side of the window 27. The opening 27A penetrates the display section 21B in the front-rear direction. The LCD 5 is disposed behind the opening 27A (see FIG. 3). Information displayed on a front surface 5A of the LCD 5 (see FIG. 4) is visible outside the casing 2 through the window 27.

A cassette mounting section (not shown) is provided inside the casing 2 and on the front side of the transparent window constituting the back cover 23. A tape cassette is mounted in the cassette mounting section. The printing mechanism mounted in the rear casing 22 has a thermal head (not shown). The thermal head has a plurality of heating elements. The tape printer 1 controls the electric current supplied to the heating elements, causing individual heating elements to generate heat, thereby printing characters on a printing surface of tape drawn out from the tape cassette.

As illustrated in FIGS. 1 and 2, the casing 2 includes a cutting lever 24 in a top portion of the right wall constituting the casing 2. An upper-left portion of the cutting lever 24 is pivotably supported on the rear casing 22, enabling an upper-right portion of the cutting lever 24 to move along an arc-shaped path on a surface extending in the top-bottom direction and the left-right direction. The cutting lever 24 is connected to the cutting mechanism mounted in the rear casing 22. The cutting mechanism cuts tape that has been printed by the printing mechanism. As illustrated in FIG. 2, the casing 2 is formed with an outlet 26. The grooved outlet 26 is formed in an upper wall of the casing 2 to the left side of the cutting lever 24. The outlet 26 allows tape to be discharged from the casing 2 after being printed by the printing mechanism.

[LCD 5]

Figure 3:
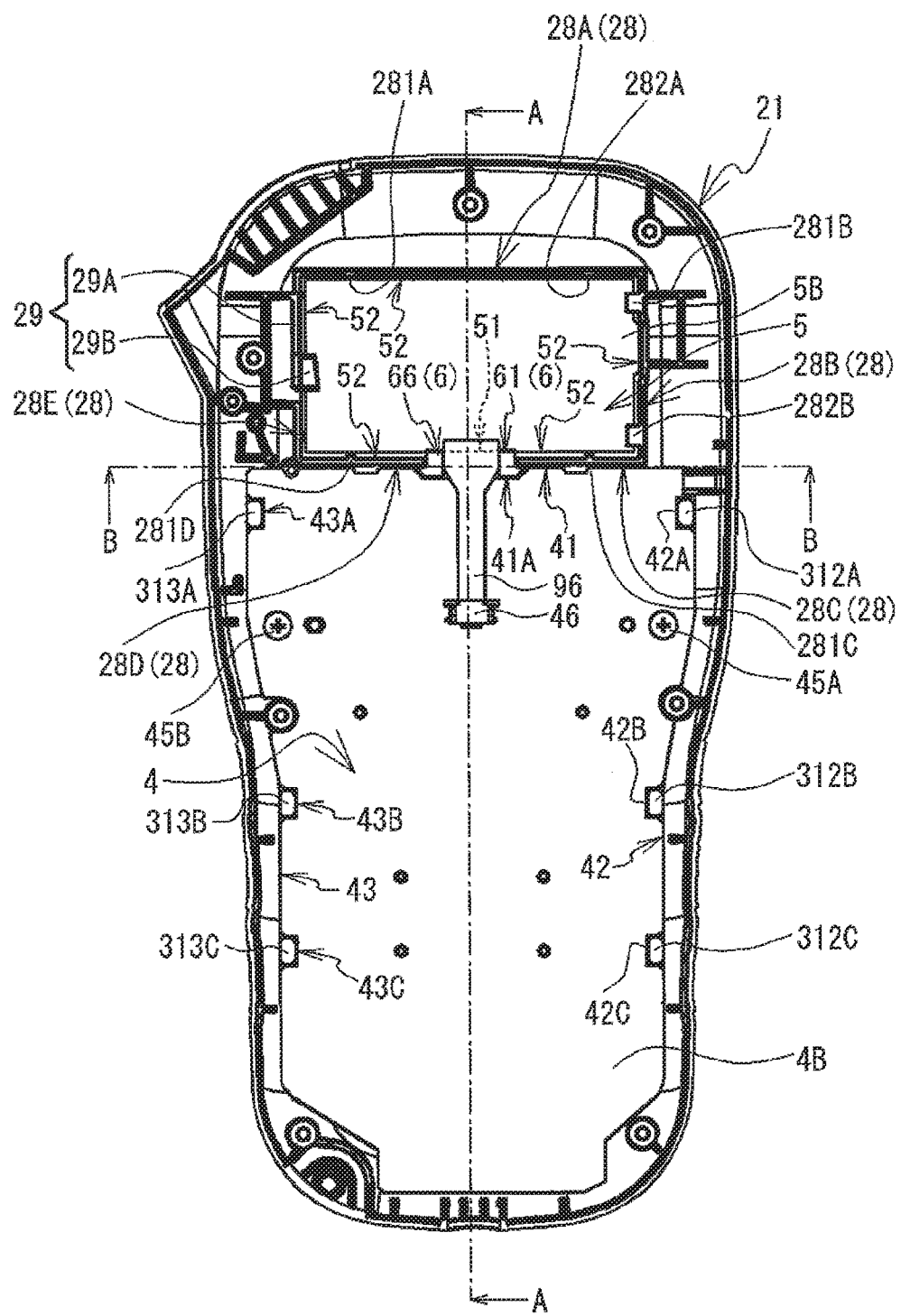
FIG. 3 is a plan view illustrating a rear side of a front casing of the tape printer according to the embodiment.
Figure 4:
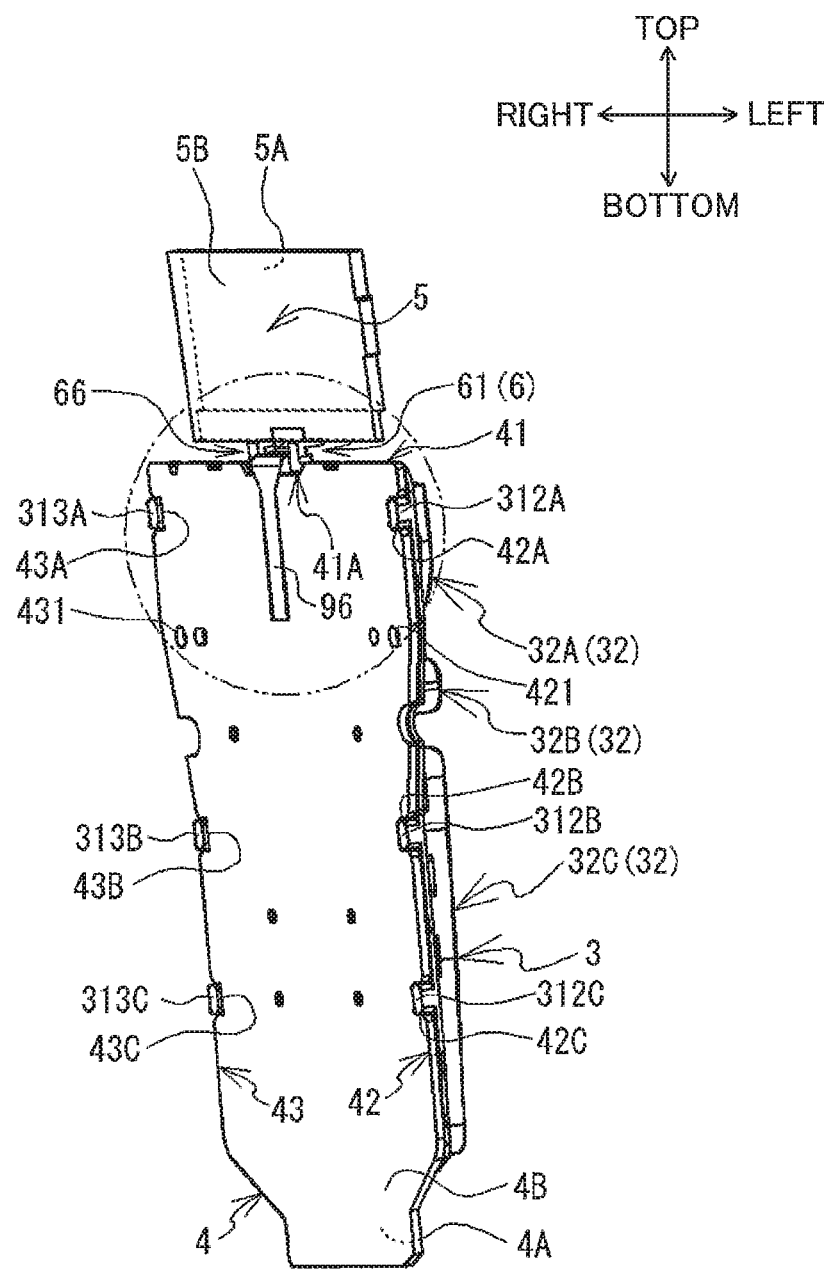
FIG. 4 is a perspective view illustrating an assembly of a key sheet, a printed circuit board, and an LCD in the tape printer according to the embodiment.

As illustrated in FIGS. 3 and 4, the LCD 5 has a rectangular shape in a plan view and extending in the left-right direction. A liquid crystal display element is disposed on the front surface 5A of the LCD 5 (see FIG. 4). The front surface 5A of the LCD 5 corresponds to the display surface. The LCD 5 can display information on the front surface 5A. The front surface 5A occupies a plane orthogonal to the front-rear direction of the tape printer 1. The front surface 5A of the LCD 5 abuts the opening 27A formed in the front casing 21 (see FIG. 1). The LCD 5 has lengths in the vertical and left-right directions greater than lengths of the opening 27A in the vertical and left-right directions.

[Cover Parts 28]

As illustrated in FIG. 3, cover parts 28A, 28B, 28C, 28D, and 28E (hereinafter collectively referred to as "cover parts 28") are disposed on a rear surface of the front wall constituting the front casing 21 and are arranged along part of a periphery of the LCD 5. The cover parts 28 protrude inward (rearward) from the rear surface on the front wall of the front casing 21. The cover parts 28 have a plate shape. The cover parts 28 has rear ends extending rearward of a rear surface 5B of the LCD 5.

The cover part 28A is disposed above the LCD 5. The cover part 28A extends in the left-right direction, parallel to a top edge of the LCD 5. The cover part 28A covers the top edge of the LCD 5 from above. Protruding parts 281A and 282A are disposed on the bottom of the cover part 28A. The protruding parts 281A and 282A protrude downward from the bottom surface of the cover part 28A. The protruding part 281A is disposed near a right end of the cover part 28A, and the protruding part 282A is disposed near a left end of the cover part 28A.

The cover part 28B is disposed on the left side of the LCD 5. The cover part 28B extends vertically, parallel to a left edge of the LCD 5. The cover part 28B covers the left edge of the LCD 5 from the left side thereof. Protruding parts 281B and 282B are disposed on a right side of the cover part 28B and rearward of the rear surface 5B of the LCD 5. The protruding part 281B extends rightward from a position above the vertical center of the cover part 28B, and the protruding part 282B extends rightward from a position below the vertical center of the cover part 28B. Protruding parts (not shown) are disposed on the right side of the cover part 28B at positions forward of the protruding parts 281B and 282B. These protruding parts protrude rightward from the right surface of the cover part 28B.

The cover part 28E is disposed on the right side of the LCD 5. The cover part 28E covers the right edge of the LCD 5 from the right side thereof. Part of the cover part 28E is recessed rightward. An urging part 29 is provided at the cover part 28E. The urging part 29 has a first portion 29A and a second portion 29B. The first portion 29A extends downward from a position on the cover part 28E above the rightwardly recessed part. The first portion 29A is spaced apart from the rear surface on the front wall of the front casing 21 in the front-rear direction. The second portion 29B extends leftward from the bottom end of the first portion 29A. The second portion 29B has a front surface, and the front surface has a part protruding forward. The part of the second portion 29B protruding forward contacts the right edge of the LCD 5. The urging part 29 urges the LCD 5 leftward through the elastic force of the first portion 29A. The left edge of the LCD 5 contacts the protruding parts (not shown) provided at the right surface of the cover part 28B and forward of the protruding parts 281B and 282B from the right side the protruding parts. In this way, the left and right sides of the LCD 5 are interposed between the structure described above, fixing the left-right position of the LCD 5. Further, the right edge of the LCD 5 is gripped on both front and rear sides by the front casing 21 and the second portion 29B of the urging part 29 and the left edge of the LCD 5 is gripped on both front and rear sides by the front casing 21 and the protruding parts 281B and 282B thereby fixing the front-rear position of the LCD 5.

The cover parts 28C and 28D are disposed below the LCD 5. The cover parts 28C and 28D extend in the left-right direction parallel to a bottom edge of the LCD 5 (as an example of an edge face). The cover part 28C is disposed leftward from the left-right center of the casing 2. The cover part 28C covers a portion of the bottom edge of the LCD 5 to the left of the left-right center of the LCD 5 from below. A protruding part 281C is provided on the top of the cover part 28C. The protruding part 281C protrudes upward from the top surface of the cover part 28C. The cover part 28D is disposed rightward from the left-right center of the casing 2. The cover part 28D covers a portion of the bottom edge of the LCD 5 to the right of the left-right center of the LCD 5 from below. A protruding part 281D is provided on the top of the cover part 28D. The protruding part 281D protrudes upward from the top surface of the cover part 28D.

A gap is formed between the right end of the cover part 28C and the left end of the cover part 28D. A portion of the bottom edge of the LCD 5 corresponding to this gap is not covered by the cover parts 28C and 28D from below. Hereinafter, the portion of the bottom edge of the LCD 5 that is not covered from below by the cover parts 28C and 28D will be called a "first portion 51." The remaining peripheral edges of the LCD 5 that include the top edge, left edge, right edge, and the portion of the bottom edge that excludes the first portion 51, i.e., all edge portions covered by the cover parts 28A, 28B, 28C, 28D, and 28E will be called a "second portion 52."

[Printed Circuit Board 4]

Figure 5:
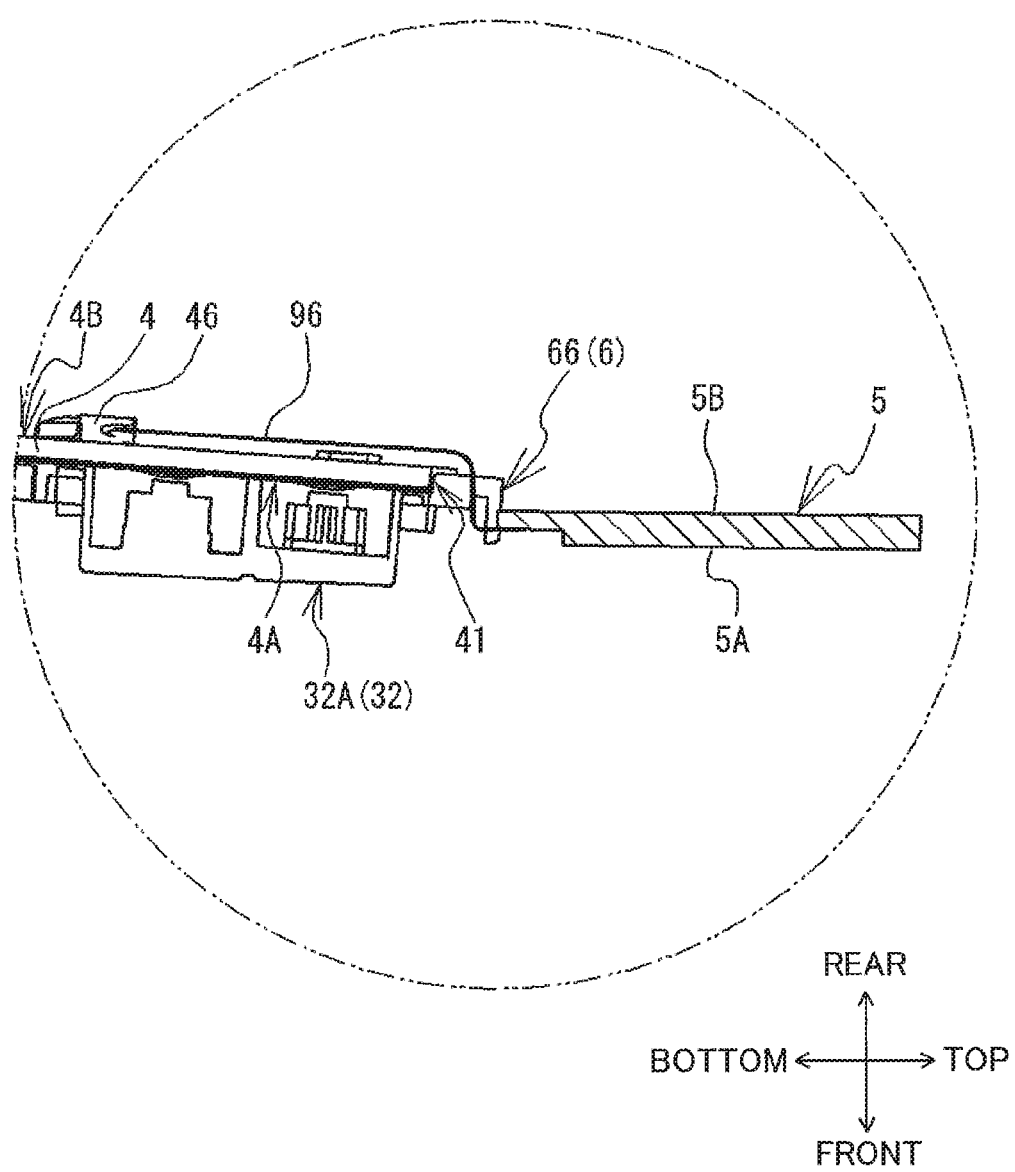
FIG. 5 is a cross-sectional view taken along a line A-A in FIG. 3 when viewed in a direction indicated by an arrow.

As illustrated in FIGS. 3 and 4, the printed circuit board 4 is disposed below the LCD 5. The printed circuit board 4 has a rectangular shape in a plan view and extending in the vertical direction. The printed circuit board 4 may be formed of glass epoxy, paper phenol, or a composite thereof. The printed circuit board 4 has a length in the left-right direction greater than a length of the LCD 5 in the left-right direction. As illustrated in FIG. 5, the printed circuit board 4 is disposed rearward of the LCD 5. More specifically, a front surface 4A of the printed circuit board 4 is positioned rearward of the rear surface 5B of the LCD 5.

As illustrated in FIG. 4, a through-hole 421 is formed in the printed circuit board 4 at a position above the vertical center of the printed circuit board 4 and near a left end 42 of the printed circuit board 4. A through-hole 431 is formed in the printed circuit board 4 at a position above the vertical center of the printed circuit board 4 and near a right end 43 of the printed circuit board 4. As illustrated in FIG. 3, screws 45A and 45B are inserted through the corresponding through-holes 421 and 431 from the rear side thereof. The screws 45A and 45B are screwed into threaded holes (not shown) provided at the rear surface on the front wall of the front casing 21. The screws 45A and 45B fix the printed circuit board 4 to the front casing 21 with the key sheet 3 (described later) interposed between the printed circuit board 4 and the front casing 21.

As illustrated in FIGS. 3 and 4, a recessed part 41A is formed in a top end 41 of the printed circuit board 4. The recessed part 41A is positioned in the left-right center of the top end 41 of the printed circuit board 4, and is recessed downward from the top end 41. Recessed parts 42A, 42B, and 42C are formed in the left end 42 of the printed circuit board 4 and are recessed rightward from the left end 42. The recessed parts 42A, 42B, and 42C are respectively arranged near a top end of the left end 42, in an approximate vertical center of the left end 42, and near a bottom end of the left end 42. Recessed parts 43A, 43B, and 43C are formed in the right end 43 of the printed circuit board 4 and are recessed leftward from the right end 42. The recessed parts 43A, 43B, and 43C are respectively arranged near a top end of the right end 43, in an approximate vertical center of the right end 43, and near a bottom end of the right end 43.

A plurality of sensing parts (not shown) is provided at the front surface 4A of the printed circuit board 4 (see FIG. 4). The sensing parts are terminals that are toggled between a conducting state and a non-conducting state in response to contact from plungers 321 of the key sheet 3 described later (see FIG. 7). A CPU and the like (not shown) are mounted on a rear surface 4B of the printed circuit board 4. The CPU performs control processes for detecting the electrical states of the sensing parts and for displaying information on the LCD 5.

A flexible printed circuit (hereinafter called a "FPC") 96 electrically connects the LCD 5 and the printed circuit board 4. The FPC 96 transfers electric signals outputted from the CPU on the printed circuit board 4 to the LCD 5. The FPC 96 is coated with a polyimide material.

A bottom end of the FPC 96 is disposed at a position above the vertical center and in the left-right center of the rear surface 4B on the printed circuit board 4. The bottom end of the FPC 96 is connected to the rear surface 4B through a connector 46. Note that the connector 46 is not shown in FIG. 4. As illustrated in FIG. 5, the top end of the FPC 96 is connected to the front surface 5A of the LCD 5 near the bottom edge thereof. Specifically, the FPC 96 extends upward from the connector 46 along the rear surface 4B of the printed circuit board 4, and then bends forward at a position above the recessed part 41A formed in the top end 41 of the printed circuit board 4 (see FIG. 4). The FPC 96 passes over the recessed part 41A of the printed circuit board 4 from the rear side to the front side. The FPC 96 subsequently bends upward at a position forward of the front surface 4A on the printed circuit board 4, extends upward, and connects to the front surface 5A of the LCD 5.

[Key Sheet 3]

Figure 6:
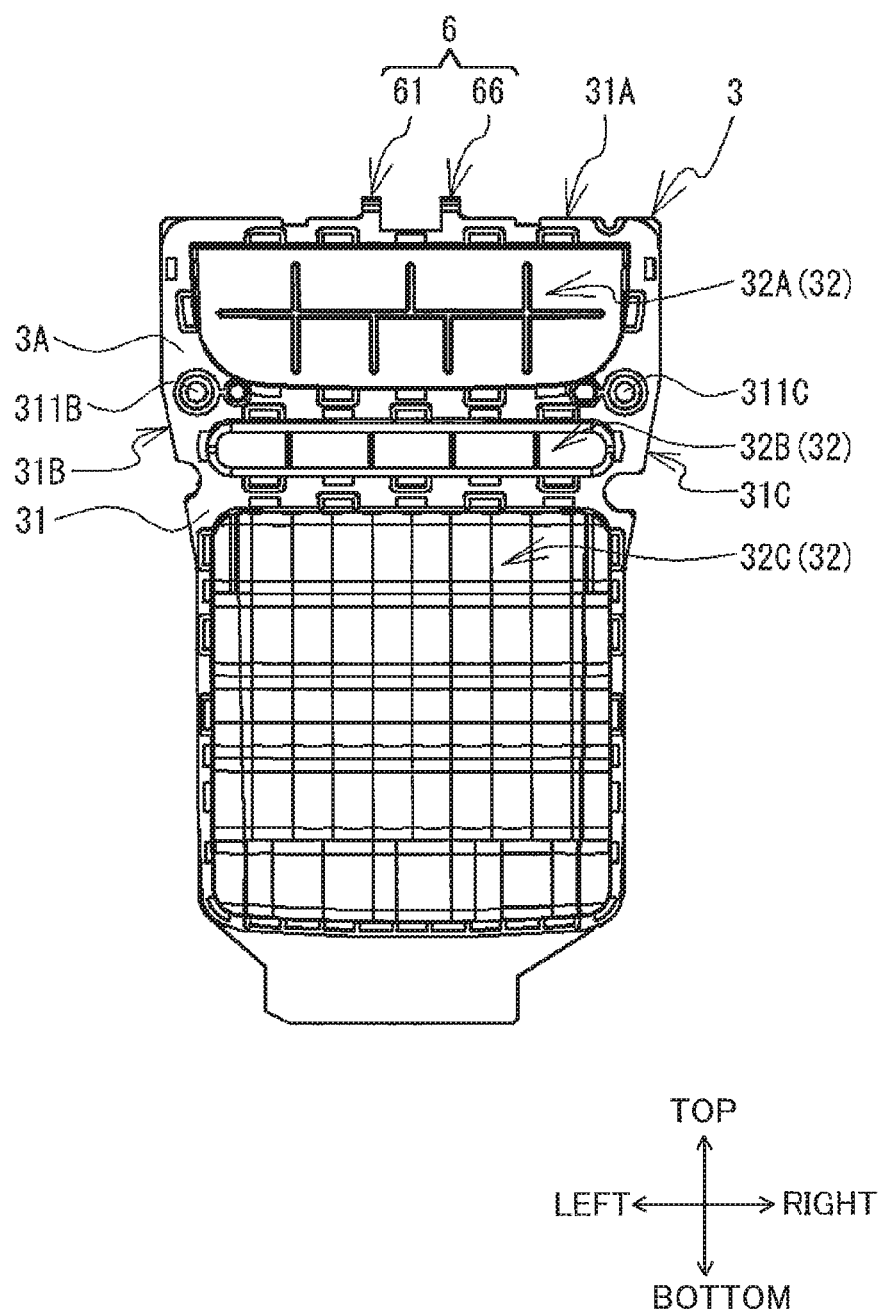
FIG. 6 is a front view of the key sheet.
Figure 7:
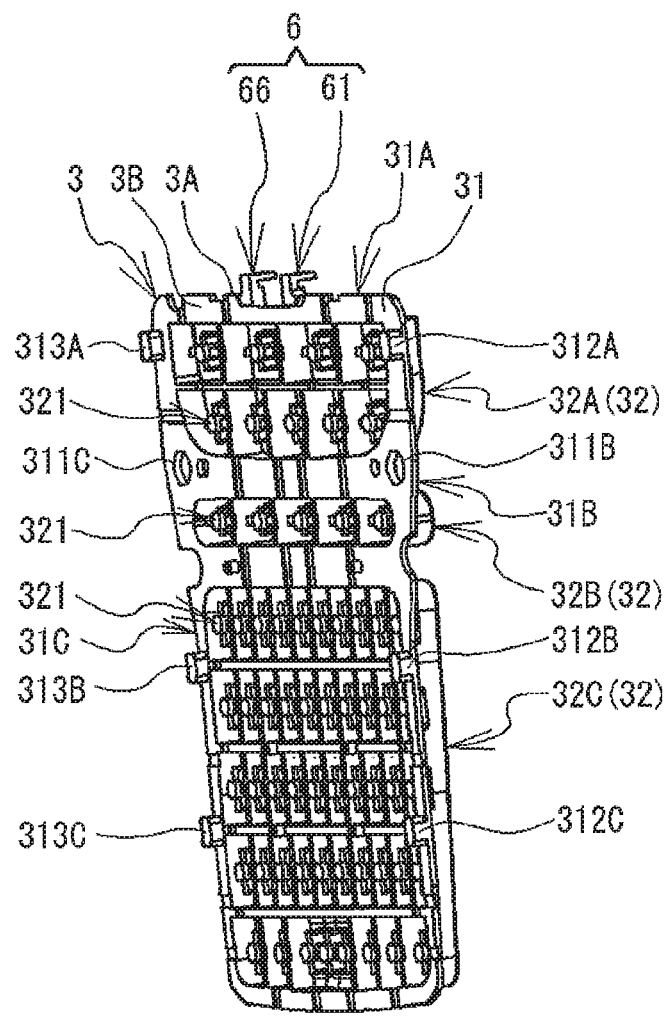
FIG. 7 is a rear perspective view of the key sheet.
Figure 7:
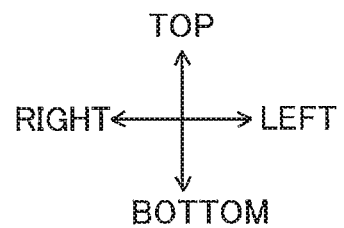

The key sheet 3 is a flexible rubber member. As illustrated in FIG. 4, the key sheet 3 is disposed on the front side of the printed circuit board 4. As illustrated in FIGS. 6 and 7, the key sheet 3 has a base sheet 31, pluralities of key tops 32A, 32B, and 32C (hereinafter collectively called "key tops 32"), a plurality of plungers 321 (see FIG. 7) and protruding parts 61 and 66 (hereinafter collectively referred to as the "protruding parts 6").

As illustrated in FIG. 6, the base sheet 31 is a sheet-like member that is generally rectangular in a plan view. A rear surface 3B (see FIG. 7) of the base sheet 31 faces the front surface 4A (see FIG. 4) of the printed circuit board 4. A through-hole 311B is disposed at a position above the vertical center of the base sheet 31 and near a left end 31B of the base sheet 31. A through-hole 311C is disposed at a position above the vertical center of the base sheet 31 and near a right end 31C of the base sheet 31. The screws 45A and 45B (see FIG. 3) that fix the printed circuit board 4 to the front casing 21 are inserted through the through-holes 311B and 311C. The key sheet 3 is fixed to the casing 2 in a state interposed between the printed circuit board 4 and the front casing 21.

As illustrated in FIG. 7, the base sheet 31 has protruding parts 312A, 312B, 312C, 313A, 313B, and 313C that protrude rearward from the rear surface 3B. The protruding parts 312A, 312B, and 312C are respectively arranged near a top end of the left end 31B, in the approximate vertical center of the left end 31B, and near a bottom end of the left end 31B. The protruding parts 313A, 313B, and 313C are respectively arranged near a top end of the right end 31C, in the approximate vertical center of the right end 31C, and near a bottom end of the right end 31C. As illustrated in FIG. 4, the protruding parts 312A, 312B, and 312C are respectively fitted into the recessed parts 42A, 42B, and 42C of the printed circuit board 4, and the protruding parts 313A, 313B, and 313C are respectively fitted into the recessed parts 43A, 43B, and 43C of the printed circuit board 4. Through these fittings, the key sheet 3 is fixed in position relative to the printed circuit board 4.

As illustrated in FIG. 6, the key tops 32 are convex parts that protrude forward from the base sheet 31. The key tops 32A are formed below but near a top end 31A of the base sheet 31. The key tops 32A include four convex parts aligned in the left-right direction (a first row), and five convex parts aligned in the left-right direction (a second row) beneath the first row. The key tops 32A correspond to a power button, cursor buttons, a print button, and the like. The key tops 32B are formed on the base sheet 31 below the key tops 32A. The key tops 32B include five convex parts aligned in a single row in the left-right direction. The key tops 32B correspond to a menu button, a mode toggle button, and the like. The key tops 32C are formed on the base sheet 31 below the key tops 32B. The key tops 32C include a plurality of convex parts arranged in a matrix. The key tops 32C correspond to alphabetic buttons, numeric buttons, and the like. As illustrated in FIG. 1, the key tops 32A, 32B, and 32C are respectively inserted into the openings 25A, 25B, and 25C formed in the front casing 21 of the casing 2 from the rear side thereof.

As illustrated in FIG. 7, the plungers 321 are disposed inside the key tops 32. Each plunger 321 protrudes rearward from the rear surface of a corresponding key top 32. The rear end of each plunger 321 has a circular cross section. When the corresponding key top 32 is not pressed, the rear end of the plunger 321 is disposed forward of the rear surface 3B on the base sheet 31. When the corresponding key is pressed, the rear end of the plunger 321 protrudes rearward of the rear surface 3B on the base sheet 31 and contacts the sensing part on the printed circuit board 4 (see FIG. 4). The CPU of the printed circuit board 4 detects when a key top 32 has been pressed based on a change in an electrical state caused by a plunger 321 contacting a corresponding sensing part.

As illustrated in FIGS. 6 and 7, the protruding parts 61 and 66 are disposed on the top end 31A of the base sheet 31. The shapes of the protruding parts 61 and 66 have left-right symmetry. The protruding part 61 is disposed leftward from the left-right center of the base sheet 31, while the protruding part 66 is disposed rightward from the left-right center of the base sheet 31. The protruding parts 61 and 66 have a general columnar shape with a rectangular cross section and are bent in the middle.

Figure 8:
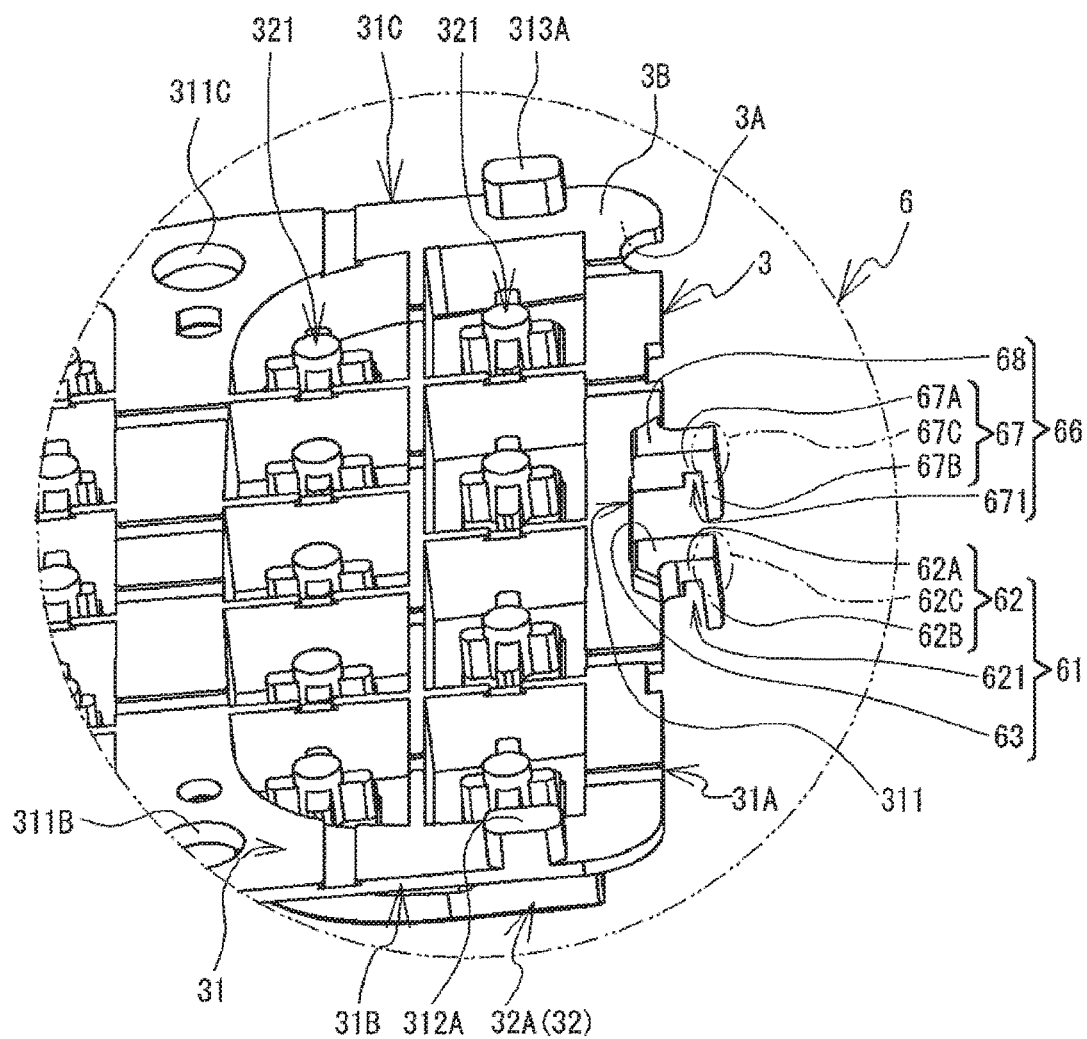
FIG. 8 is an enlarged perspective view of a protruding part of the key sheet.
Figure 8:
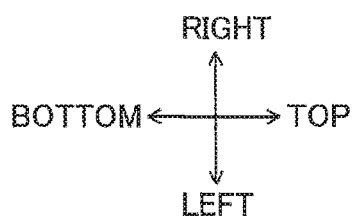

As illustrated in FIG. 8, the protruding part 61 has a first protruding part 62, and a second protruding part 63. The first protruding part 62 constitutes the portion of the protruding part 61 protruding above the top end 31A of the base sheet 31 that is forward of the rear surface 3B of the base sheet 31. The first protruding part 62 has a first extension part 62A, a second extension part 62B, and a bent part 62C. The first extension part 62A extends upward from the top end 31A of the base sheet 31. The second extension part 62B extends forward from a top end of the first extension part 62A. The front end of the second extension part 62B protrudes forward of a front surface 3A of the base sheet 31. The bent part 62C is the connecting portion between the first extension part 62A and the second extension part 62B. In other words, the bent part 62C is provided between a tip end (top end) of the first extension part 62A and a base end of the second extension part 62B. The angle formed at the bent part 62C between the first extension part 62A and the second extension part 62B is approximately 90 degrees when no external forces are applied. A recessed part 621 is recessed rearward from a front side of the first extension part 62A at the part that connected to the second extension part 62B.

The second protruding part 63 constitutes the portion of the protruding part 61 that protrudes rearward of the rear surface 3B of the base sheet 31. The second protruding part 63 includes a part provided on the rear surface 3B of the base sheet 31, and a part provided on a rear surface of the first extension part 62A. A distance from the rear surface 3B on the base sheet 31 of the key sheet 3 to a rear end portion of the second protruding part 63, i.e., a length in the front-rear direction of the second protruding part 63, is approximately equal to a thickness of the printed circuit board 4 (see FIG. 4).

The protruding part 66 has a first protruding part 67, and a second protruding part 68. The first protruding part 67 has a first extension part 67A, a second extension part 67B, and a bent part 67C. A recessed part 671 is provided in the first extension part 67A. The first protruding part 67, the first extension part 67A, the second extension part 67B, the bent part 67C, the recessed part 671, and the second protruding part 68 correspond to the first protruding part 62, the first extension part 62A, the second extension part 62B, the bent part 62C, the recessed part 621, and the second protruding part 63 of the protruding part 61, respectively.

Figure 9:
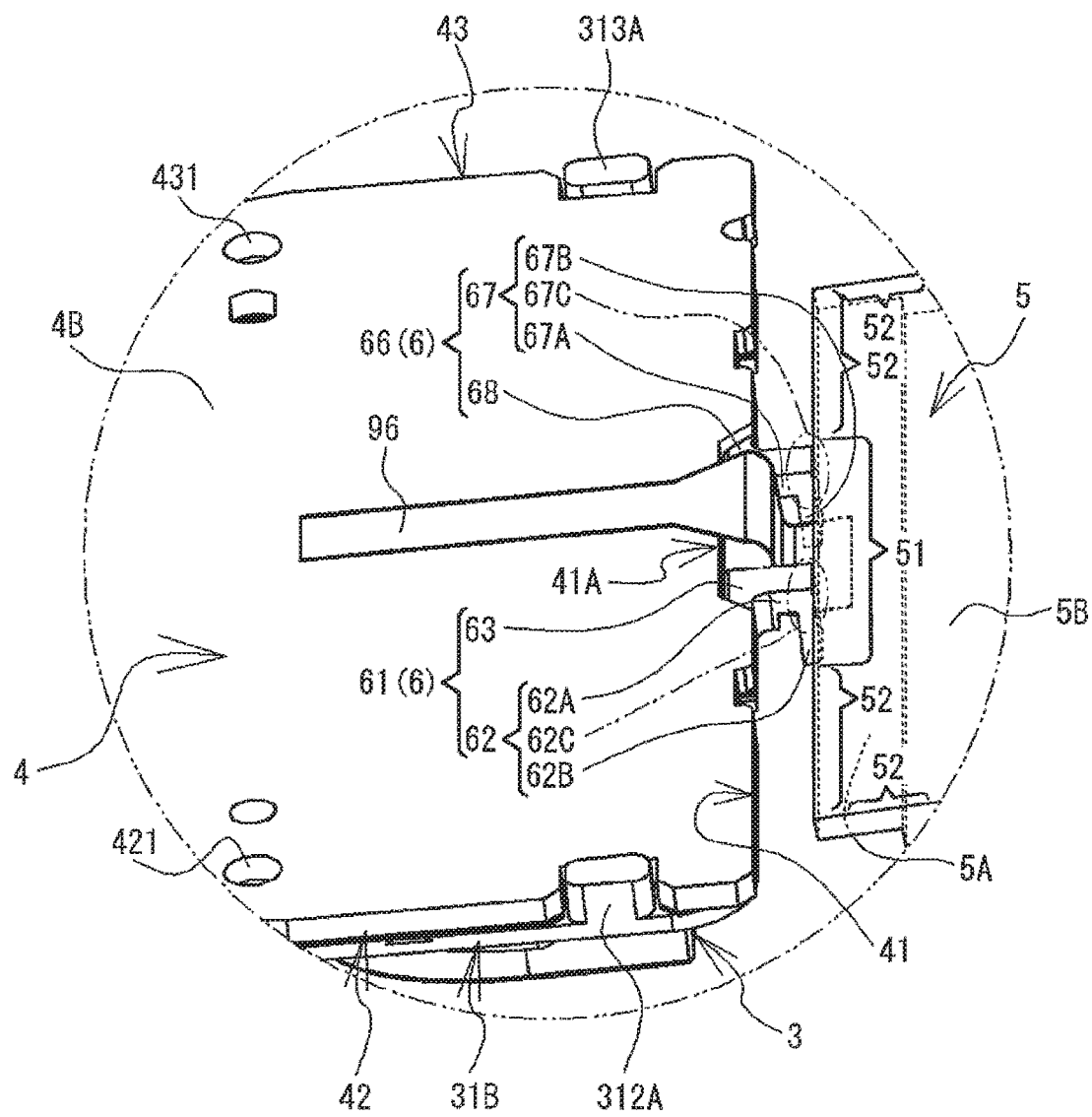
FIG. 9 is an enlarged perspective view of the printed circuit board and the protruding part of the key sheet.

When the key sheet 3, printed circuit board 4, and LCD 5 are assembled in the front casing 21 (see FIG. 3) as illustrated in FIG. 9, the portion of the top end 31A on the key sheet 3 that is interposed between the protruding parts 61 and 66 (hereinafter called a "top end 311" (see FIG. 8)) is substantially aligned in position with the recessed part 41A formed in the top end 41 of the printed circuit board 4 in the front-rear direction. A bottom edge of the second protruding part 63 and a portion of a left edge of the second protruding part 63 near its bottom edge contact a portion of the recessed part 41A formed in the printed circuit board 4 near a left end thereof. Further, the bottom edge of the second protruding part 68 and a portion of a right edge of the second protruding part 68 near its bottom edge contact a portion of the recessed part 41A formed in the printed circuit board 4 near a right end thereof. Rear surfaces of the second protruding parts 63 and 68 are arranged in substantially the same plane as the rear surface 4B on the printed circuit board 4.

The first portion 51 on the bottom edge of the LCD 5 contacts top surfaces of the second extension parts 62B and 67B near their front end portions. An external force applied by the LCD 5 causes the first protruding part 62 to deform in a direction that reduces the angle formed by the first extension part 62A and second extension part 62B to an acute angle and causes the first protruding part 67 to deform in a direction that reduces the angle formed by the first extension part 67A and second extension part 67B to an acute angle. The angle formed by the first extension part 62A and second extension part 62B and the angle formed by the first extension part 67A and second extension part 67B are decreased to slightly less than about 90 degrees. A restoring force in response to this elastic deformation acts on both the bent parts 62C and 67C. This restoring force causes the second extension parts 62B and 67B to urge the LCD 5 upward. Accordingly, the top edge of the LCD 5 is pressed against the protruding parts 281A and 282A (see FIG. 3) of the cover part 28A from below. As illustrated in FIG. 3, the top and bottom edges of the LCD 5 are gripped by the protruding parts 281A and 282A and the protruding parts 6, respectively, fixing the vertical position of the LCD 5.

The recessed part 41A formed in the printed circuit board 4 contacts the second protruding parts 63 and 68. Accordingly, the printed circuit board 4 restrains downward movement of the second protruding parts 63 and 68. Hence, even when a downward force acts on the second extension parts 62B and 67B due to contact from the LCD 5, the vertical position of the second extension parts 62B and 67B does not change.

Figure 10:
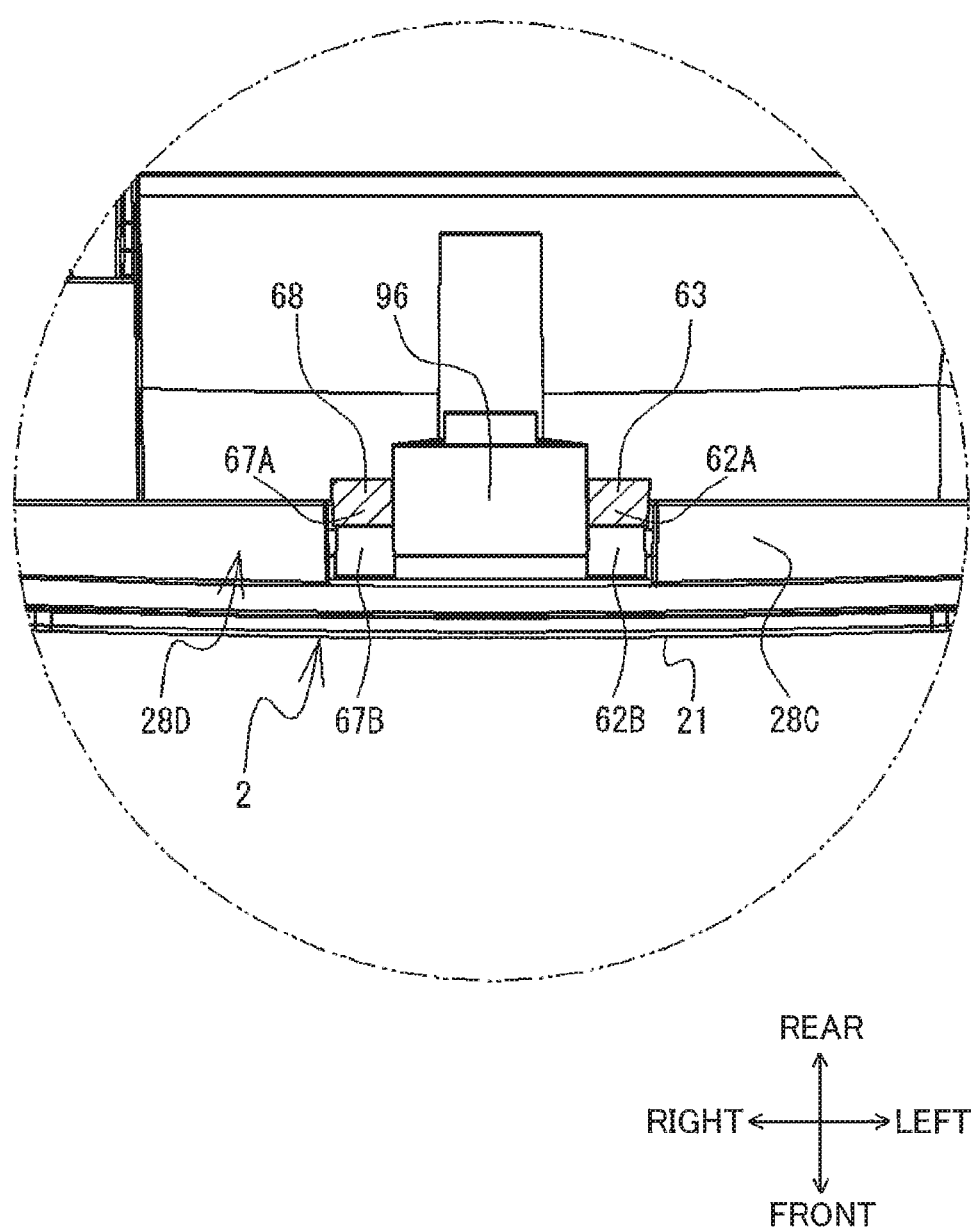
FIG. 10 is a cross-sectional view taken alone a line B-B in FIG. 3 when viewed in a direction indicated by an arrow.

The segment of the FPC 96 extending in the front-rear direction from a side of the rear surface 4B of the printed circuit board 4 to a side of the front surface 5A of the LCD 5 is interposed in the left-right direction between right surfaces of the first extension part 62A and the second protruding part 63, and left surfaces of the first extension part 67A and the second protruding part 68. As illustrated in FIG. 10, the first extension part 62A and the second protruding part 63 are interposed between a left end of the FPC 96 and a right end of the cover part 28C. Right end portions of the first extension part 62A and the second protruding part 63 contact the left end of the FPC 96. A left end of the first extension part 62A contacts the right end of the cover part 28C. Further, the first extension part 67A and the second protruding part 68 are interposed between a right end of the FPC 96 and a left end of the cover part 28D. Left ends of the first extension part 67A and the second protruding part 68 contact the right end of the FPC 96. A right end of the first extension part 67A contacts the left end of the cover part 28D. When viewing the interior of the front casing 21 from the rear side, as illustrated in FIG. 3, there is no overlap between the first protruding part 62 and the cover part 28C or between the first protruding part 67 and the cover part 28D. Hence, when viewing the interior of the front casing 21 from the rear side, there is no overlap between the FPC 96 and the cover part 28C or between the FPC 96 and the cover part 28D.

[Primary Functions and Effects of the Embodiment]

In the tape printer 1 according to the embodiment described above, the protruding parts 6 of the key sheet 3 can apply an upward urging force to the LCD 5. Providing the protruding parts 6 on the key sheet 3 eliminates the need to provide a new member around the LCD 5 for upward urging the same. Accordingly, the LCD 5 can be suitably mounted on the casing 2 without play, even when the tape printer 1 provides little space around the LCD 5.

The portion of the protruding part 61 near the bottom end of the second protruding part 63 contacts the portion of the printed circuit board 4 near the left end of the recessed part 41A. Further, the portion of the protruding part 66 near the bottom end of the second protruding part 68 contacts the portion of the printed circuit board 4 near the right end of the recessed part 41A. With this configuration, contact between the second protruding parts 63 and 68 and the printed circuit board 4 restrains the first protruding parts 62 and 67 from moving downward in response to the external force from the LCD 5. Therefore, the first protruding parts 62 and 67 can effectively apply an urging force to the LCD 5. As a result, the first protruding parts 62 and 67 can suitably press the top edge of the LCD 5 against the protruding parts 281A and 282A of the cover part 28A from below, and hence, the LCD 5 can be firmly gripped from the top and bottom edges by the protruding parts 281A and 282A and the protruding parts 6. Accordingly, the configuration of the tape printer 1 enables the LCD 5 to be more suitably mounted on the casing 2.

Further, portions of each of the second protruding parts 63 and 68 are provided on the rear surfaces of the corresponding first extension parts 62A and 67A of the first protruding parts 62 and 67. That is, the second protruding parts 63 and 68 function as reinforcing members for the first extension parts 62A and 67A, thereby suppressing the first extension parts 62A and 67A from being bent in response to the external force from the LCD 5. Further, the printed circuit board 4 holds the second protruding parts 63 and 68 from below, thereby directly restraining downward movement of the first protruding parts 62 and 67. Therefore, the first protruding parts 62 and 67 can efficiently transfer an urging force to the LCD 5 in response to the restoring force acting on the bent parts 62C and 67C.

The first portion 51 of the bottom edge of the LCD 5 contacts the top surfaces of the second extension parts 62B and 67B near the front end portions thereof. The second extension parts 62B and 67B extend forward from the top end portions of the first extension parts 62A and 67A, respectively. Accordingly, even if the positional relationship of the LCD 5 and key sheet 3 in the front-rear direction varies due to assembling error, the second extension parts 62B and 67B can be placed in contact with the LCD 5. Thus, the protruding parts 6 are configured such that the second extension parts 62B and 67B can urge the LCD 5 upward through a restoring force acting on the bent parts 62C and 67C independent of the positional relationship between the LCD 5 and the key sheet 3.

The cover parts 28 cover the outer edges of the second portion 52 constituting the periphery of the LCD 5. The cover parts 28 suppress dust and other foreign matter from entering the space around the LCD 5. Further, the protruding parts 6 place the first protruding parts 62 and 67 in contact with the first portion 51, which is the only area on the periphery of the LCD 5 not covered by the cover parts 28. Therefore, the protruding parts 6 can suppress foreign matter from entering the space around the LCD 5 through the first portion 51.

The first extension part 62A and second protruding part 63 are interposed between the left end of the FPC 96 and the right end of the cover part 28C. Similarly, the first extension part 67A and second protruding part 68 are interposed between the right end of the FPC 96 and the left end of the cover part 28D. When the interior of the front casing 21 is viewed from the rear side, there is no overlap between the FPC 96 and the cover part 28C or between the FPC 96 and the cover part 28D. In this way, the FPC 96 and the first protruding parts 62 and 67 can seal the first portion 51 of the LCD 5 that is not covered by cover parts 28. Hence, the FPC 96 and first protruding parts 62 and 67 can restrain foreign matter from entering the area around the LCD 5 through gaps between the cover parts 28C and 28D. Further, the FPC 96 is interposed between the first extension parts 62A and 67A, and the first extension parts 62A and 67A are interposed between the FPC 96 and the cover parts 28C and 28D, respectively. Hence, the FPC 96 can be prevented from contacting the cover parts 28.

[Modification of the Embodiment]

While the description has been made in detail with reference to the above embodiment, it would be apparent to those skilled in the art that many modifications and variations may be made thereto. Next, a modification of the embodiment will be described with reference to FIGS. 11 through 13. In the modified embodiment, a key sheet 30 is provided instead of the key sheet 3 of the above embodiment. The remaining structure of the tape printer 1 is identical to that in the embodiment and will not be described here.

Figure 11:
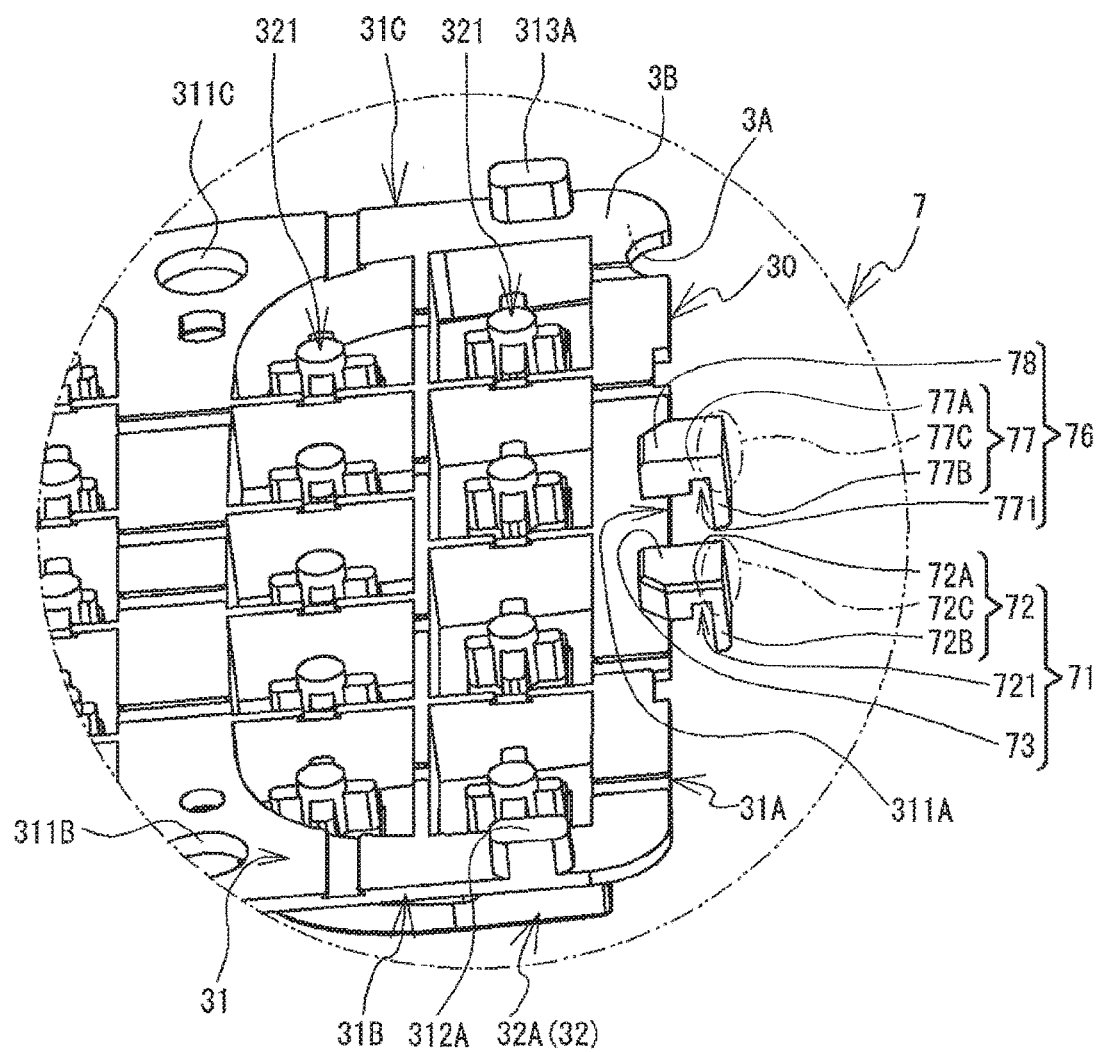
FIG. 11 is an enlarged perspective view of a protruding part of a key sheet in a tape printer according to a modified embodiment.
Figure 11:
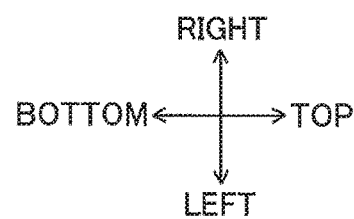

As illustrated in FIG. 11, the key sheet 30 according to the modified embodiment has protruding parts 71 and 76 (hereinafter collectively referred to as the "protruding parts 7"). The protruding part 71 has a first protruding part 72, and a second protruding part 73. The first protruding part 72 has a first extension part 72A, a second extension part 72B, and a bent part 72C. A recessed part 721 is recessed rearward from a front side of the first extension part 72A. The protruding part 76 has a first protruding part 77, and a second protruding part 78. The first protruding part 77 has a first extension part 77A, a second extension part 77B, and a bent part 77C. A recessed part 771 is recessed rearward from a front side of the first extension part 77A.

The protruding parts 7, 71, and 76 correspond to the protruding parts 6, 61, and 66 of the above embodiment illustrated in FIG. 8. The first protruding part 72, the first extension part 72A, the second extension part 72B, the bent part 72C, the recessed part 721, and the second protruding part 73 correspond to the first protruding part 62, the first extension part 62A, the second extension part 62B, the bent part 62C, the recessed part 621, and the second protruding part 63 in FIG. 8, respectively. The first protruding part 77, the first extension part 77A, the second extension part 77B, the bent part 77C, the recessed part 771, and the second protruding part 78 correspond to the first protruding part 67, the first extension part 67A, the second extension part 67B, the bent part 67C, the recessed part 671, and second protruding part 68 in FIG. 8, respectively. The protruding parts 7 differ from the protruding parts 6 in their lengths in the left-right direction. A length of the protruding part 71 in the left-right direction is longer toward the left side than the protruding part 61. Similarly, a length of the protruding part 76 in the left-right direction is longer toward the right side than the protruding part 66.

Further, in the modified embodiment, the portion of the top end 31A of the base sheet 31 on the key sheet 30 that is interposed between the protruding parts 71 and 76 (hereinafter called the "top end 311A") is at a different position from the top end 311 (see FIG. 8) in the above embodiment. The top end 311A is disposed above the top end 311 in the above embodiment. That is, the top end 311A protrudes farther upward from the base sheet 31 than the top end 311.

Figure 12:
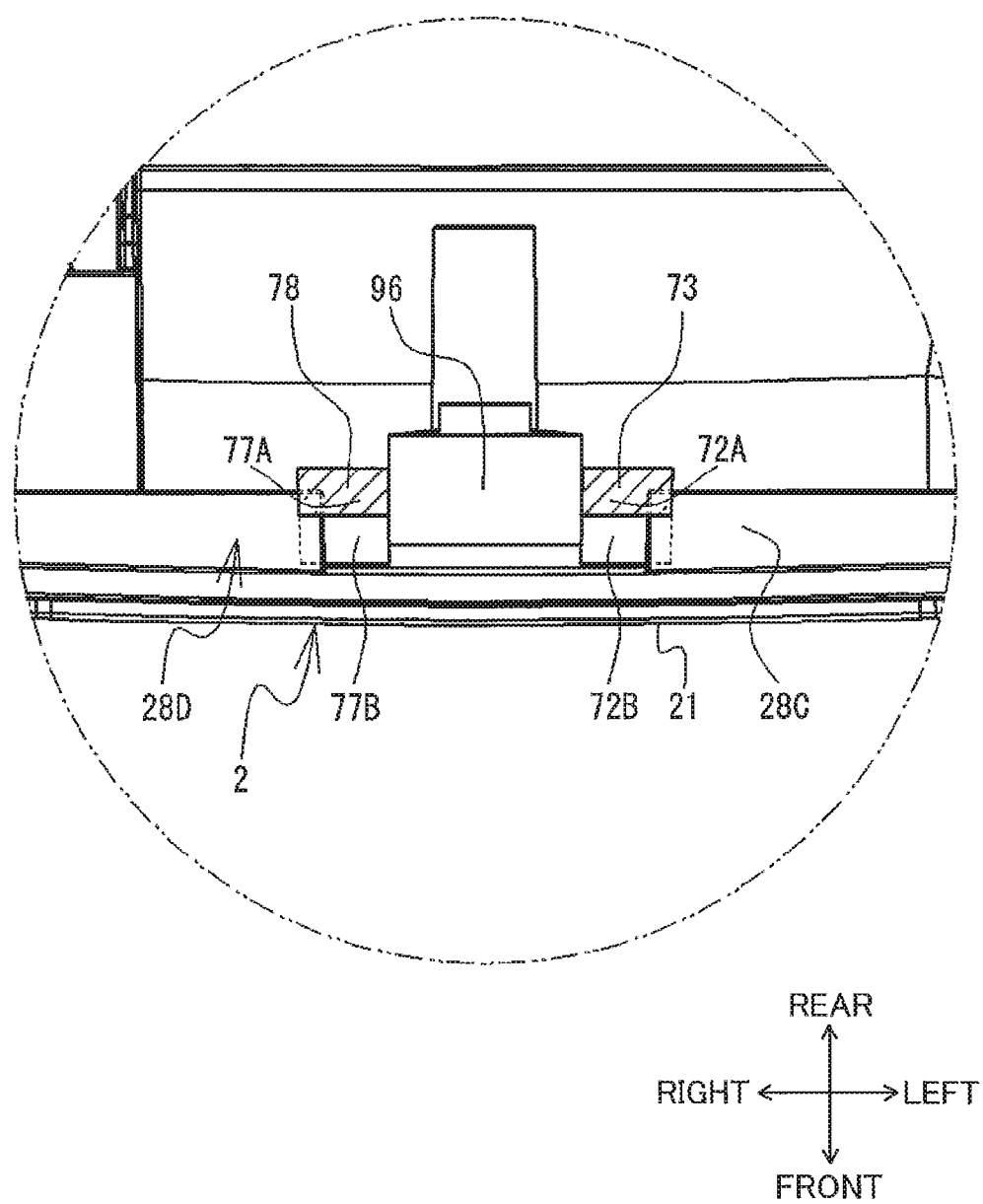
FIG. 12 is a cross-sectional view taken along the line B-B in FIG. 3 when viewed in the direction indicated by the arrow according to the modified embodiment.

When the key sheet 30, the printed circuit board 4, and the LCD 5 are assembled in the front casing 21 (see FIG. 3) as illustrated in FIG. 12, the first extension part 72A and second protruding part 73 are interposed between the left end of the FPC 96 and the right end of the cover part 28C. The right ends of the first extension part 72A and second protruding part 73 contact the left end of the FPC 96. The right end of the cover part 28C is disposed on a front side of the recessed part 721 formed in the first extension part 72A (see FIG. 11). Similarly, the first extension part 77A and second protruding part 78 are interposed between the right end of the FPC 96 and the left end of the cover part 28D. The left ends of the first extension part 77A and second protruding part 78 contact the right end of the FPC 96. The left end of the cover part 28D is disposed on a front side of the recessed part 771 formed in the first extension part 77A (see FIG. 11).

Figure 13:
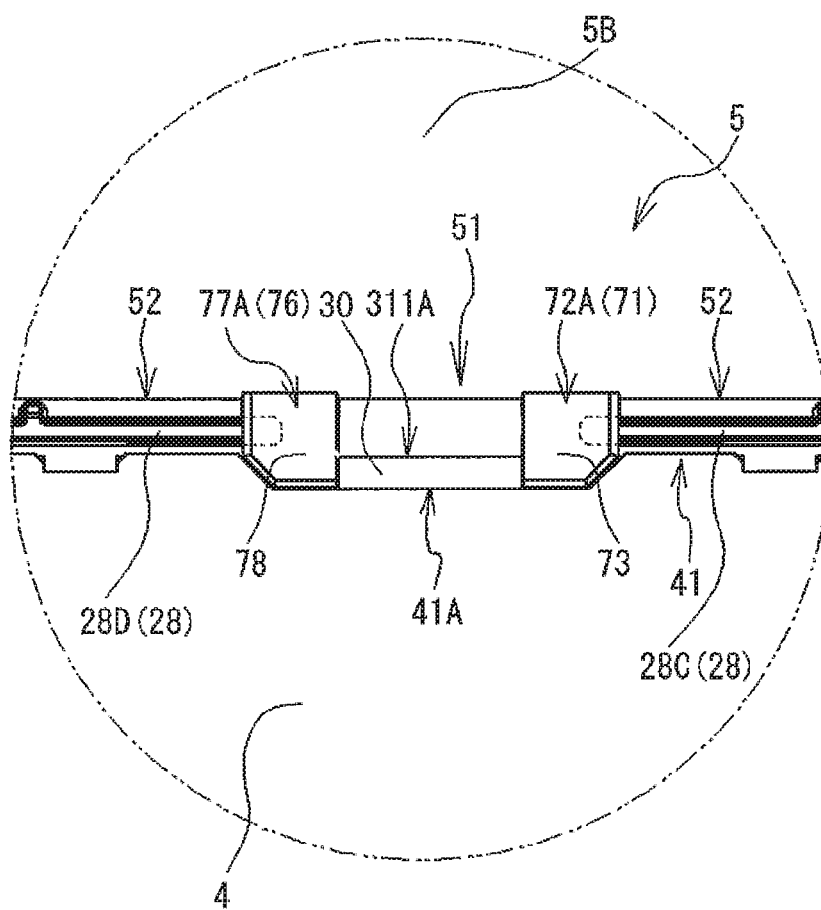
FIG. 13 is an enlarged plan view illustrating a rear side of the protruding part of the key sheet according to the modified embodiment.

When viewing the interior of the front casing 21 from the rear side, as illustrated in FIG. 13, portions of the first extension part 72A and second protruding part 73 of the protruding part 71 overlap the cover part 28C and portions of the first extension part 77A and second protruding part 78 of the protruding part 76 overlap the cover part 28D. Note that the FPC 96 has been omitted from FIG. 13. In this case, gaps are not formed between the protruding parts 72 and 73, and the cover part 28C, and between the protruding parts 73 and 78, and the cover part 28D. Thus, the structure in the modified embodiment suppresses the generation of the gap between the protruding part 71 and the cover part 28C, and the gap between the protruding part 76 and the cover part 28D. Accordingly, the tape printer 1 can more reliably suppress foreign matter from entering the area around the LCD 5 through gaps between the protruding parts 71 and 76, and the cover parts 28.

Further, the top end 311A of the key sheet 30 protrudes upward of the recessed part 41A formed in the printed circuit board 4. That is, the top end 311A of the key sheet 30 is positioned between the recessed part 41A of the printed circuit board 4 and the portion of the FPC 96 that passes beneath the first portion 51 of the LCD 5 in the front-rear direction. With this arrangement, the top end 311A of the key sheet 30 can suppress the FPC 96 from contacting the recessed part 41A of the printed circuit board 4. Hence, the tape printer 1 in the modified embodiment suppresses the printed circuit board 4 from damaging the FPC 96.

In the modified embodiment described above, a portion of the key sheet 30 near the top end 311A may be bent rearward. That is, the portion of the key sheet 30 near the top end 311A may be configured to cover the recessed part 41A of the printed circuit board 4 from the top side. With this configuration, the top end 311A of the key sheet 30 can more effectively prevent the FPC 96 from contacting the recessed part 41A of the printed circuit board 4.

[Other Modifications]

In the above embodiment, the protruding part 61 has the first protruding part 62 and second protruding part 63, while the protruding part 66 has the first protruding part 67 and second protruding part 68. However, the second protruding parts 63 and 68 may be omitted from the protruding parts 6. In this modification, the rear surfaces of the first protruding parts 62 and 67 may be arranged in the same plane as the rear surface 3B on the base sheet 31 of the key sheet 3.

Further, the first protruding part 62 in the embodiment has the first extension part 62A, second extension part 62B, and bent part 62C, while the first protruding part 67 has the first extension part 67A, second extension part 67B, and bent part 67C. Here, the angle formed at the bent part 62C by the first extension part 62A and second extension part 62B and the angle formed at the bent part 67C by the first extension part 67A and second extension part 67B need not be approximately 90 degrees. These angles may be either larger or smaller than approximately 90 degrees. However, these angles are preferably 90 degrees or greater in order that the restoring force acting on the bent parts 62C and 67C can reliably urge the LCD 5.

Further, the first protruding part 62 need not be provided with the second extension part 62B and bent part 62C, and the first protruding part 67 need not be provided with the second extension part 67B and bent part 67C. In other words, the first protruding part 62 may be configured of only the first extension part 62A, and the first protruding part 67 may be configured of only the first extension part 67A. In this case, the free ends of the first extension parts 62A and 67A may contact the first portion 51 on the bottom edge of the LCD 5. This contact may compress the first extension parts 62A and 67A vertically, causing the first extension parts 62A and 67A to elastically deform. In this state, the protruding parts 61 and 66 urge the LCD 5 upward through a restoring force in response to this elastic deformation. In this modification, the first extension parts 62A and 67A can act as the urging parts. Alternatively, when the first protruding part 62 is configured of only the first extension part 62A and the first protruding part 67 is configured of only the first extension part 67A, front surfaces of the first extension parts 62A and 67A may be sloped forward from bottom to top. In other words, lengths (widths) of the first extension parts 62A and 67A in the front-rear direction may be gradually increased toward the top.

In the above embodiment, a gap is formed between the right end of the cover part 28C and the left end of the cover part 28D. However, the right end of the cover part 28C may be connected to the left end of the cover part 28D. That is, the cover parts 28A-28E may cover the entire periphery of the LCD 5 from all four sides. In this modification, the first extension parts 62A and 67A of the protruding parts 6 may pass on the rear side of the cover parts 28 from the bottom to the top. In other words, the protruding parts 6 may be arranged to straddle the rear sides of the cover parts 28C and 28D vertically.

Further, the second extension parts 62B and 67B of the corresponding protruding parts 61 and 66 may be connected in the left-right direction. In this case, the protruding parts 61 and 66 may be treated as a single protruding part 6, and an opening that penetrates the protruding part 6 in the front-rear direction may be provided to allow passage of the FPC 96. Further, the top end of the FPC 96 may be connected to the rear surface 5B of the LCD 5. In this case, the protruding parts 61 and 66 may be connected to each other in the left-right direction. Hence, the key sheet 3 may be configured of only a single protruding part 6.

[Correspondences]

The tape printer 1 is an example of a printing device. The LCD 5 is an example of a display member. The FPC 96 is an example of a cable. The top end 311A of the key sheet 30 is an example of a guard portion.

What is claimed is:

1. A printing device comprising:
   a casing;
   a display member configured to display information thereon, the display member having a first edge face and a second edge face opposite to the first edge face, the first edge face of the display member contacting the casing;
   a printed circuit board; and
   a key sheet fixed to the casing and facing the printed circuit board, the key sheet comprising:
      a base sheet providing elasticity and positioned beside the display member, the base sheet having a peripheral edge facing the second edge face of the display member;
      a plurality of key tops provided at the base sheet; and
      a protruding part provided at the base sheet, the protruding part including a first protruding part protruding from the peripheral edge of the base sheet toward the display member and contacting the second edge face of the display member to urge the display member, the protruding part supporting the display member in cooperation with the casing.

2. The printing device according to claim 1, wherein the printed circuit board has a peripheral edge facing the second edge face of the display member; and
   wherein the protruding part further comprises a second protruding part protruding and contacting the peripheral edge of the printed circuit board.

3. The printing device according to claim 1, wherein the first protruding part comprises:
   a first extension part extending from the peripheral edge of the base sheet toward the display member and having a tip end; and
   a second extension part having a base end and extending from the tip end of the first extension part in a direction different from a direction in which the first extension part extends, the second extension part contacting the second edge face, a bent part being provided between the tip end of the first extension part and the base end of the second extension part, the second extension part urging the display member through a restoring force acting on the bent part.

4. The printing device according to claim 1, wherein the display member has an outline edge comprising a first portion and a second portion, the first portion constituting at least a portion of the second edge face of the display member;
   wherein the casing has an inner surface and further comprises a cover part protruding inward from the inner surface and covering the second portion; and
   wherein the first protruding part contacts the first portion.

5. The printing device according to claim 4, further comprising a cable electrically connecting the display member and the printed circuit board;
   wherein the display member has a display surface;
   wherein the cable and the cover part are offset from each other as viewed in a direction perpendicular to the display surface; and
   wherein the first protruding part has a first protrusion and a second protrusion, the first protrusion being disposed at one side of the cable and the second protrusion being disposed at another side of the cable.

6. The printing device according to claim 5, wherein each of the first protrusion and the second protrusion has at least a portion overlapping with the cover part as viewed in the direction perpendicular to the display surface.

7. The printing device according to claim 1, further comprising a cable electrically connecting the display member and the printed circuit board, the printed circuit board having a peripheral edge facing the second edge face of the display member,
   wherein the key sheet further comprises a guard portion constituting the peripheral edge of the base sheet facing the second edge face of the display member, the guard portion being positioned between the peripheral edge of the printed circuit board and the cable.

8. The printing device according to claim 7, wherein the first protruding part has a first protrusion and a second protrusion; and
   wherein the guard portion is positioned at a position between the first protrusion and the second protrusion.

9. A printing device comprising:
   a casing;
   a display member configured to display information thereon, the display member having an edge face;
   a printed circuit board; and
   a key sheet fixed to the casing and facing the printed circuit board, the key sheet comprising:
      a base sheet providing elasticity and positioned beside the display member, the base sheet having a peripheral edge facing the edge face of the display member;
      a plurality of key tops provided at the base sheet; and a protruding part provided at the base sheet, the protruding part including a first protruding part protruding from the peripheral edge of the base sheet toward the display member and contacting the edge face of the display member to urge the display member, the first protruding part comprising:
- a first extension part extending from the peripheral edge of the base sheet toward the display member and having a tip end; and
- a second extension part having a base end and extending from the tip end of the first extension part in a direction different from a direction in which the first extension part extends, the second extension part contacting the edge face, a bent part being provided between the tip end of the first extension part and the base end of the second extension part, the second extension part urging the display member through a restoring force acting on the bent part.

10. A printing device comprising:
a casing;
a display member configured to display information thereon, the display member having an edge face;
a printed circuit board; and
a key sheet fixed to the casing and facing the printed circuit board, the key sheet comprising:
- a base sheet providing elasticity and positioned beside the display member, the base sheet having a peripheral edge facing the edge face of the display member;
- a plurality of key tops provided at the base sheet; and
- a protruding part provided at the base sheet, the protruding part including a first protruding part protruding from the peripheral edge of the base sheet toward the display member and contacting the edge face of the display member to urge the display member;
wherein the display member has an outline edge comprising a first portion and a second portion, a first portion constituting at least a portion of the edge face of the display member;
wherein the casing has an inner surface and further comprises a cover part protruding inward from the inner surface and covering the second portion; and
wherein the first protruding part contacts the first portion.

11. The printing device according to claim 10, further comprising a cable electrically connecting the display member and the printed circuit board;
wherein the display member has a display surface;
wherein the cable and the cover part are offset from each other as viewed in a direction perpendicular to the display surface; and
wherein the first protruding part has a first protrusion and a second protrusion, the first protrusion being disposed at one side of the cable and the second protrusion being disposed at another side of the cable.

12. The printing device according to claim 11, wherein each of the first protrusion and the second protrusion has at least a portion overlapping with the cover part as viewed in the direction perpendicular to the display surface.

13. A printing device comprising:
a casing;
a display member configured to display information thereon, the display member having an edge face;
a printed circuit board;
a key sheet fixed to the casing and facing the printed circuit board, the key sheet comprising:
- a base sheet providing elasticity and positioned beside the display member, the base sheet having a peripheral edge facing the edge face of the display member;
- a plurality of key tops provided at the base sheet; and
- a protruding part provided at the base sheet, the protruding part including a first protruding part protruding from the peripheral edge of the base sheet toward the display member and contacting the edge face of the display member to urge the display member; and
a cable electrically connecting the display member and the printed circuit board, the printed circuit board having a peripheral edge facing the edge face of the display member,
wherein the key sheet further comprises a guard portion constituting the peripheral edge of the base sheet facing the edge face of the display member, the guard portion being positioned between the peripheral edge of the printed circuit board and the cable.

14. The printing device according to claim 13, wherein the first protruding part has a first protrusion and a second protrusion; and
wherein the guard portion is positioned at a position between the first protrusion and the second protrusion.

* * * * *